(12) United States Patent
Matsuda

(10) Patent No.: US 8,792,127 B2
(45) Date of Patent: Jul. 29, 2014

(54) IMAGE FORMING APPARATUS, CONTROL METHOD THEREOF, AND STORAGE MEDIUM

(75) Inventor: Hiroshi Matsuda, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 156 days.

(21) Appl. No.: 13/434,469

(22) Filed: Mar. 29, 2012

(65) Prior Publication Data

US 2012/0250094 A1 Oct. 4, 2012

(30) Foreign Application Priority Data

Apr. 4, 2011 (JP) .................................. 2011-082890

(51) Int. Cl.
*G06F 15/00* (2006.01)

(52) U.S. Cl.
USPC ....... 358/1.17; 358/1.13; 358/1.14; 358/1.15; 358/1.9; 382/303; 382/304

(58) Field of Classification Search
USPC ...................... 358/1.13, 1.14, 1.15, 1.17, 1.9; 382/303, 304
See application file for complete search history.

(56) References Cited

U.S. PATENT DOCUMENTS

| | | | | |
|---|---|---|---|---|
| 6,088,480 A * | 7/2000 | Sakamoto | ...................... | 382/180 |
| 6,493,100 B1 * | 12/2002 | Endo et al. | .................... | 358/1.14 |
| 6,609,210 B1 * | 8/2003 | Onuma | ......................... | 713/323 |
| 2009/0225363 A1 * | 9/2009 | Endo | ............................ | 358/1.15 |
| 2011/0170893 A1 * | 7/2011 | Nishikawa | ....................... | 399/81 |

FOREIGN PATENT DOCUMENTS

JP 2006-015515 A 1/2006

* cited by examiner

*Primary Examiner* — Jacky X Zheng

(74) *Attorney, Agent, or Firm* — Canon U.S.A., Inc., IP Division

(57) ABSTRACT

An image forming apparatus includes a renderer configured to render a one page amount of image data based on intermediate data generated by either a first execution unit or a second execution unit, a printer engine configured to form image data of a page rendered by the renderer on a recording medium, and after forming the image data, stop each unit in the engine when there is no image data formation instruction corresponding to a next page of the page even after a cycle down time limit has elapsed, and a request unit configured to, during generation of intermediate data of a predetermined page by the first execution unit, request an extension of the cycle down time limit set in the printer engine based on a number of pages of rendered image data corresponding to intermediate data of pages following the predetermined page.

8 Claims, 6 Drawing Sheets

IMAGE FORMING APPARATUS, CONTROL METHOD THEREOF, AND STORAGE MEDIUM

BACKGROUND OF THE INVENTION

1. Field of the Invention

The present invention relates to an image forming apparatus, a control method thereof, and a storage medium.

2. Description of the Related Art

An image forming apparatus, such as a copying machine and a laser printer, includes a controller for generating image data to be used in printing. This controller receives print data from a host computer, analyzes that data, and performs image processing. Further, the image forming apparatus also includes an engine (printer engine) communicably connected to the controller, which performs an image forming operation based on the image data from the controller. The controller transmits various instructions relating to image formation as commands to the engine. The engine sends back information about the internal state of the engine as a status report to the controller.

When print data from the host computer is received, the controller starts processing for analyzing the print data and rasterizing it into image data. First, the controller transmits a printing preparation request command to the engine. Then, the engine transitions from a standby state to a printing state in which a printing operation can be performed. When the engine is transitioning from a standby state to a printing state, the engine starts up various motors and other such actuators, which are a drive source for conveying a recording medium. Further, the engine also starts up the various units that perform the charging, exposure, development, transfer, and fixing necessary for an electrophotographic process. These processes are a pre-processing step performed before the printing operation. This pre-processing step is referred to as "pre-rotation". Further, when image processing finishes, the controller transmits a printing start request command to the engine. When the engine receives the printing start request command, the engine starts the printing operation.

When printing of all of the pages in the print data is completed, the controller transmits a printing completion command. The engine receives the printing completion command, and determines that all of the printing operation has finished. In addition, the engine stops the various actuators and units that should be transitioned back to a standby state. These processes are a post-processing step performed after the printing operation. This post-processing step is referred to as "post-rotation". The time required for the pre-rotation and post-rotation depends on the type of printer engine. Some printer engines take about a few seconds, while other printer engines may take about several dozen seconds.

Further, even if the engine does not receive a printing completion command, if a predetermined time period has elapsed since reception of the last printing start request command, the engine determines that the printing operation has finished, and starts post-rotation. However, this causes a problem if a new printing start request command is transmitted from the controller immediately thereafter. Once the engine has started post-rotation it is difficult to stop that process midway through, so that the post-rotation is executed until the end. Then, based on the new printing start instruction from the controller, the engine again executes pre-rotation. Specifically, the image forming apparatus user has to wait for output the extra time took for executing both the post-rotation and pre-rotation. When image data could not be formed even though a predetermined time has elapsed since reception of the last printing start request command, the engine enters post-rotation. This operation is referred to as "cycle down". Further, the waiting time from after entering post-rotation until entering pre-rotation is referred to as "downtime".

Various methods have been proposed to improve the occurrence of such downtime. Japanese Patent Application Laid-Open No. 2006-015515 discusses a method in which a command for notifying that printing start will be delayed is prepared to prevent the engine from entering post-rotation even if a reply to a command corresponding to printing start of the next page is delayed. Further, when this command (printing start delay command) is received from the controller, the engine extends the timing for entering post-rotation.

On the other hand, to satisfy throughput of engines, methods for shortening the raster image processor (RIP) processing time of the print data by the controller have also been proposed. Recently, improvements in the central processing unit clock have hit a ceiling, and the trend towards using multiple cores, in which a plurality of cores is housed in a single package, in progressing. To fully utilize the performance of a multi-core CPU, RIP processing needs to be performed in parallel. Several methods have been proposed for this, such as a job parallel processing method in which a plurality of jobs is simultaneously subjected to RIP processing in parallel by a plurality of cores. In a job parallel processing method, when processing a large amount of jobs, the overall productivity can be improved. Further, another example is a page parallel processing method, in which a plurality of pages in a single job is simultaneously subjected to RIP processing in parallel by a plurality of cores. In a page parallel processing method, increased speed can be expected even for a single job.

Even if parallel processing is employed for RIP processing of print data, cases in which the time taken during the parallel processing does not keep up with engine throughput still occur. The main reasons for this are the increasing complexity of print data and the increasing speed of engines resulting from improvements in host computer performance. When considering print product productivity, although the engine could be configured so that a print standby state is maintained without the engine cycling down, such a configuration is not desirable from the perspectives of power consumption and the life of a photosensitive drum, a fixing device and other such parts.

SUMMARY OF THE INVENTION

One aspect of the present invention is directed to a system in which, when simultaneously processing pages in parallel, the time when the engine enters cycle down is delayed based on the processing situation of the pages following the page that is to be processed next.

According to an aspect of the present invention, an image forming apparatus includes a memory, a processor, coupled to the memory, the processor configured to control a first execution unit configured to perform processing for generating intermediate data in page units based on print data, a second execution unit configured to perform processing for generating intermediate data in page units based on print data in parallel with the first execution unit, a renderer configured to render a one page amount of image data based on the intermediate data generated by either the first execution unit or the second execution unit, and a printer engine configured to form image data of a page rendered by the renderer on a recording medium, and to stop, after forming the image data, each element in the engine when there is no image data formation instruction corresponding to a next page of the page even after a cycle down time limit has elapsed, wherein the processor is further configured to control a request unit configured to, during generation by the first execution unit of intermediate data of a predetermined page, request an extension to the cycle down time limit set in the printer engine based on a number of pages of rendered image data corresponding to intermediate data of pages following the predetermined page, and wherein printer engine is configured to stop each element in the engine based on a cycle down time limit that has been extended based on the extension result.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
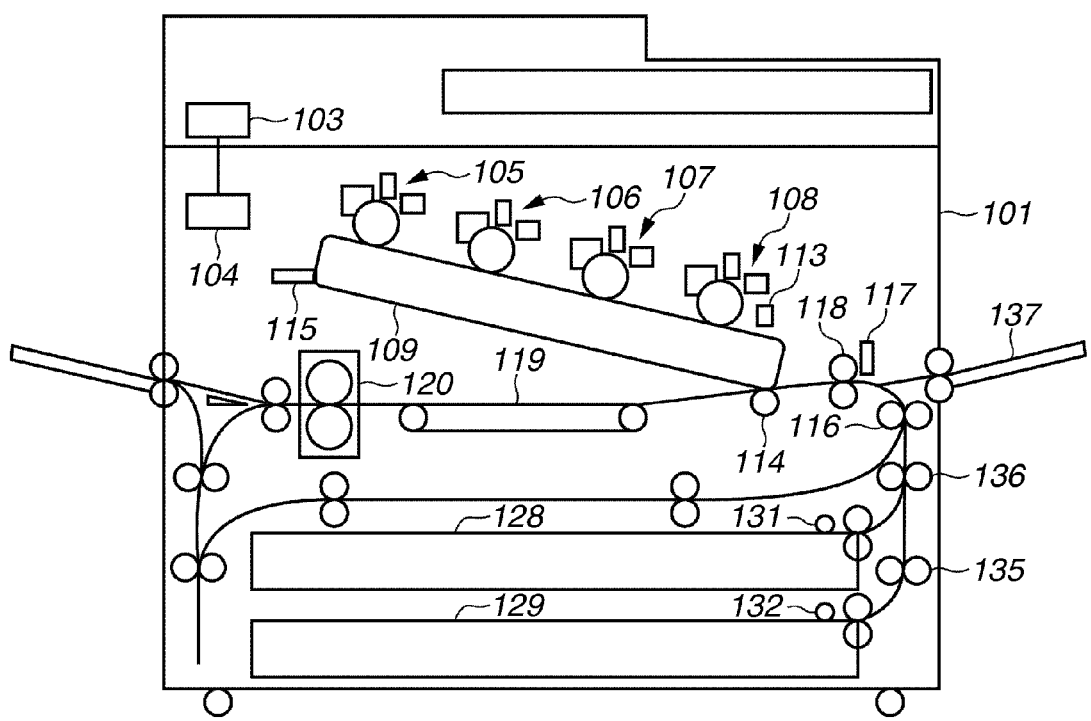
FIG. 1 is a schematic cross-sectional view of an image forming apparatus according to an exemplary embodiment of the present invention.

FIG. 1 is a schematic cross-sectional view of the image forming apparatus according to an exemplary embodiment of the present invention. The image forming apparatus is realized as, for example, a printing apparatus, a copying machine, a laser printer, a facsimile machine, or a multifunction peripheral (MFP).

A printer engine 101 includes various hardware mechanisms for forming an image. A controller 103 is a control unit for controlling the whole image forming apparatus. An engine control unit 104 is a control unit that causes the printer engine 101 to execute image formation based on control commands and image data received from the controller 103. Further, the engine control unit 104 notifies the controller 103 of the state of the printer engine 101, for example.

Image forming units 105 to 108 each have a photosensitive drum, a primary charging device, a laser exposure device, a developing sleeve, a drum cleaner and the like. Each image forming unit forms an image in the respective colors yellow (Y), magenta (M), cyan (C), and black (K), and executes primary transfer onto an intermediate transfer belt (ITB) 109.

Developer images in the respective colors are superimposed in order on the surface of the intermediate transfer belt 109 by the image forming units 105 to 108, so that ultimately a single color image is formed. The intermediate transfer belt 109 rotates in the clockwise direction in FIG. 1. A pattern detection sensor 113 detects a test pattern for adjustment processing (e.g., auto-registration, density adjustment etc.).

As illustrated in FIG. 1, the pattern detection sensor 113 is arranged downstream from the image forming units.

A secondary transfer roller 114 performs secondary transfer of the color image on the intermediate transfer belt 109 onto a recording medium. A belt cleaner 115 cleans the intermediate transfer belt 109 after secondary transfer.

When the recording medium fed from sheet feeding units 131 and 132 or a manual feed tray 137 has been conveyed by a pre-registration roller 116, and its leading edge detected by a registration sensor 117, the recording medium hits a registration roller 118 and is temporarily stopped. Subsequently, the recording medium is conveyed by the registration roller 118 and the pre-registration roller 116 in synchronization with the timing of the image on the intermediate transfer belt 109 reaching the secondary transfer position. Then, the color image on the intermediate transfer belt 109 is secondary transferred onto the recording medium by the secondary transfer roller 114. A post-secondary transfer conveyance belt 119 conveys the post-secondary transfer recording medium to a fixing device 120. The fixing device 120 fixes the unfixed color image on the recording medium.

The recording medium, which is mounted in sheet cassettes 128 and 129, is fed toward vertical pass rollers 135 and 136 by the sheet feeding units 131 and 132 of a pickup roller, for example. The fed recording medium is then conveyed to the pre-registration roller 116 by the vertical pass rollers 135 and 136.

Figure 2:
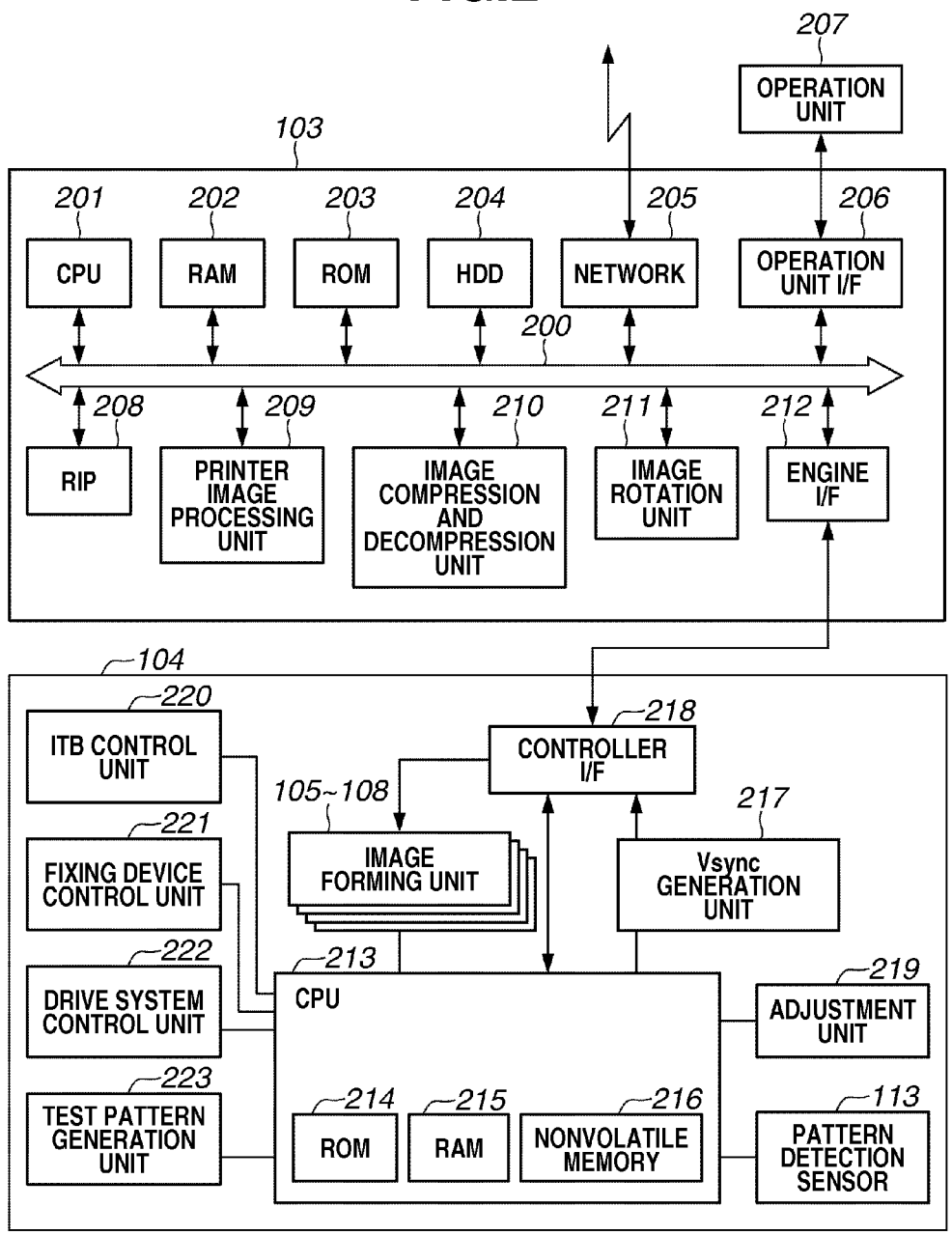
FIG. 2 is a block diagram of a whole control unit.

FIG. 2 is a block diagram of a control unit according to the present exemplary embodiment. The controller 103 controls inputs and outputs of image signals and device information. A CPU 201 reads and executes programs stored in a read-only memory (ROM) 203 or a hard disk drive (HDD) 204 in a random access memory (RAM) 202. Further, the CPU 201 controls the respective devices connected to a system bus 200 in an integrated manner. The CPU 201 is a dual-core processor that has two cores, so that it can execute two control programs simultaneously in parallel. In addition, in the present exemplary embodiment, although a CPU that integrates two cores in one CPU is used, a plurality of CPUs having one core may also be used. The RAM 202 functions as a main memory and a work area of the CPU 201. A boot program that is executed when the power is switched on is stored in the ROM 203. An operating system and a main control program of the apparatus are stored in the HDD 204. Further, the HDD 204 is also used for temporary or long-term storage of large-volume data, such as image data and print data.

A network 205 is connected to a local area network, and performs input and output of print data and device information. An operation unit interface (I/F) unit 206 is an interface unit with an operation unit 207, and outputs to the operation unit 207 image data to be displayed on the operation unit 207. Further, the operation unit I/F unit 206 also has the role of transmitting information input by a user of the apparatus from the operation unit 207 to the CPU 201. The operation unit 207 includes a liquid crystal panel and an audio source as output devices, and a touch panel and hard keys as input devices.

The controller 103 is connected to the engine control unit 104 via an engine I/F 212. The engine I/F 212 transmits image signals and receives device operation instructions and device information based on instructions from the CPU 201. A RIP 208 is a dedicated piece of hardware that rasterizes a display list, which is intermediate data, into image data. The RIP 208 processes the display list generated in the RAM 202 by the CPU 201 rapidly and in parallel with the processes executed by the CPU 201. A printer image processing unit 209 performs image correction, half toning and the like on print output image data. An image rotation unit 211 rotates the image data. An image compression and decompression unit 210 performs compression and decompression processing, such as joint photographic experts group (JPEG) for multi-value image data, and joint bi-level image experts group (JBIG), modified modified read (MMR), and modified Huffman (MH) for binary image data.

The engine control unit 104 controls the various units that perform the charging, exposure, development, transfer, fixing, and sheet conveyance necessary for the electrophotographic process. A CPU 213 is a central control unit of the printer engine 101. A ROM 214 is a storage unit that stores printer engine 101 control programs. A RAM 215 is a storage unit that is utilized as a work area when controlling the printer engine 101. A non-volatile memory 216 is a storage unit that stores various adjustment values, for example. A controller I/F 218 is a communication unit that transmits and receives commands to/from the controller 103, and receives image data from the controller 103. As described above, the image forming units 105 to 108 execute image forming using image data transferred via the controller I/F 218.

A Vsync generation unit 217 generates an image synchronization signal Vsync, and transmits the generated signal to the controller 103 via the controller I/F 218. The controller 103 transfers the image data to the engine control unit 104 in synchronization with the Vsync. Consequently, the printer engine 101 and the controller 103 are synchronized.

An adjustment unit 219 is a control unit for executing various adjustment processes for maintaining image quality. The adjustment unit 219 reduces the occurrence of color misregistration by adjusting the relationship between the Vsync and the image data based on a signal detected by the pattern detection sensor 113 and an instruction from the CPU 213. A test pattern generation unit 223 generates and transmits image data of a test pattern to be used in the adjustment processing to each image forming unit.

An ITB control unit 220 executes drive control of the intermediate transfer belt 109. A fixing device control unit 221 executes drive and temperature control of the fixing unit 120. A drive system control unit 222 controls the various motors and solenoids for executing recording medium conveyance and secondary transfer.

The printer engine 101 forms image data of a page rendered by a renderer on the recording medium, and after this image data is formed, stops each of the units in the engine when there is no image data formation instruction corresponding to the next page of the rendered page even after a cycle down time limit has elapsed. Stopping each unit means stopping the rotation of the polygon mirror drive motor, the photosensitive drum and the like included in the image forming units.

Figure 3:
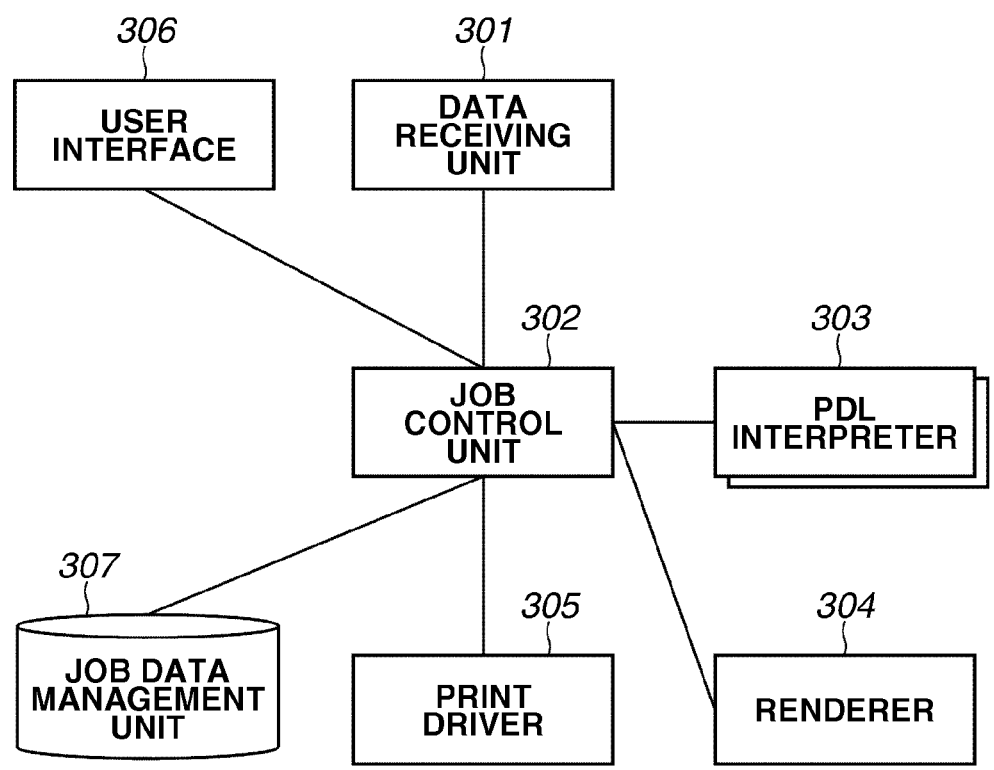
FIG. 3 is a software block diagram of a controller.

FIG. 3 is a software block diagram of the controller according to the present exemplary embodiment. The respective software modules illustrated in FIG. 3 are stored in the HDD 204 as programs, and are loaded in the RAM 202 and executed by the CPU 201. More specifically, the respective software modules are loaded in the RAM 202 by the operating system (OS) running on the CPU 201, conferred with an execution authority on a per-thread basis, and executed.

A data receiving unit 301 receives print data transmitted from a host. The received data is stored in a job data management unit 307 via a job control unit 302. The job control unit 302 performs overall job control from data reception until printing. A PDL interpreter 303 interprets a page description language (PDL), which is print data, and generates a display list, which is intermediate data. The generated display list is stored in the job data management unit 307 via the job control unit 302.

In the present exemplary embodiment, due to multi-threading, there is a plurality of PDL interpreters 303. More specifically, the PDL interpreter 303 is realized by the two cores each executing a program for realizing a PDL interpreter. Each thread performs processing for generating intermediate data in page units based on the print data.

A renderer 304 is a module that generates image data based on the display list. Much of the processing is realized by the dedicated hardware RIP 208. The renderer 304 renders a one page amount of image data based on intermediate data generated by any one of the PDL interpreters in the above-described plurality of PDL interpreters 303. The generated image data is stored in the job data management unit 307 via the job control unit 302.

In the present exemplary embodiment, although the PDL interpreter 303 and the renderer 304 generate and render the intermediate data for one page at a time, respectively, these processes do not have to be performed in page units. For example, the intermediate data can be generated and rendered for a predetermined rendering area amount in one page.

A print driver 305 transmits a print instruction and image data to the printer engine via the engine I/F 212. A user interface 306 is a module that controls the operation unit 207 via the operation unit I/F 206. The user interface 306 generates data to be displayed on the liquid crystal panel of the operation unit 207, and updates the display on the liquid crystal panel based on inputs from the touch panel.

Further, when an input from the touch panel is some kind of job execution instruction, the user interface 306 transmits the instruction to the job control unit 302. The job data management unit 307 is a database for temporary or long-term storage and management of each piece of image data.

In the present exemplary embodiment, "rendering" refers to processing in which a display list is generated by interpreting PDL data, and image data is generated based on the generated display list.

Figure 4:
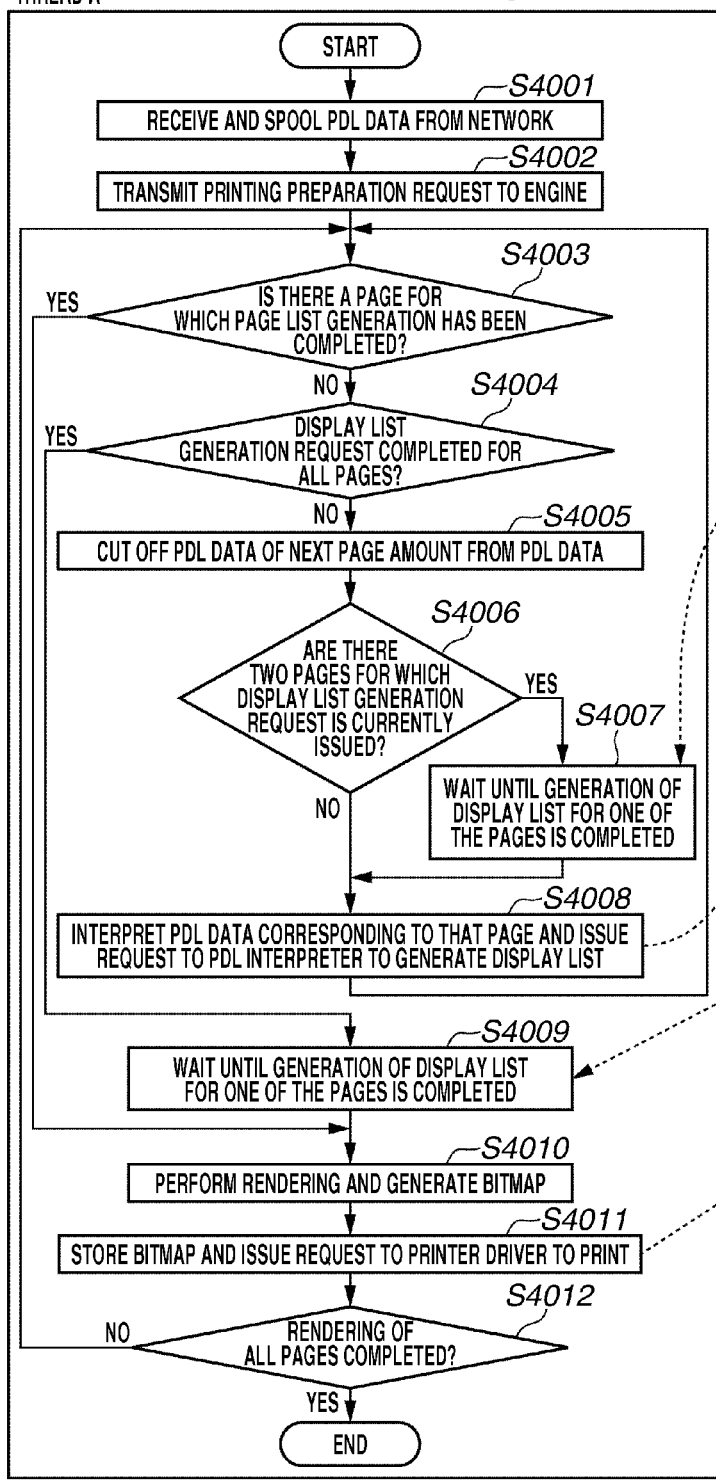
FIG. 4 is a flowchart of print processing performed by the controller.

FIG. 4 is a flowchart illustrating a basic print flow that is executed by the controller. In this description, the print flow is executed by the respective software modules illustrated in FIG. 3. Further, the flowchart is realized by the CPU 201 executing the respective programs in the software modules illustrated in FIG. 3 that are stored in the HDD 204 and that have been read in the RAM 202.

In the flowchart, four threads, i.e., threads A, B1, B2, and C, are executed in parallel. The respective threads are time-divided by the OS, and assigned with an execution authority for the two cores in order.

Since the time-division units are sufficiently small, the four threads can be considered to perform parallel operations. However, at any one given point in time, there are only two threads being simultaneously executed. This is because, as described above, the CPU 201 is a dual core processor. Since the multi-threading processing performed by the operating system is generally a well-known technique, a detailed description thereof will be omitted here.

Thread A is the main thread of the print processing, and threads B1 and B2 are interpreter threads that are dynamically generated by thread A during execution. Thread C is a resident thread that is generated by the OS during start-up of the image forming apparatus.

In the present exemplary embodiment, although thread B1 corresponds to a first execution unit and thread B2 corresponds to a second execution unit, thread B2 may correspond to the first execution unit and thread B1 to the second execution unit.

In thread A, first, in step S4001, the data receiving unit 301 receives print data, and stores that received print data in the job data management unit 307 via the job control unit 302. Next, in step S4002, the job control unit 302 transmits a printing preparation request command to the engine via the print driver 305.

Next, in step S4003, the job control unit 302 determines whether there is a page for which page list generation has been completed. Since at the beginning of the flow in FIG. 4 page list generation is not completed, it is determined in step S4003 that there are no pages for which page list generation has been completed (NO in step S4003), and the processing proceeds to step S4004. In step S4004, the job control unit 302 determines whether a display list generation request has been completed for all pages. As described below, the display list generation processing for each page is carried out by making a request to a separate thread.

Since at the beginning of the flow in FIG. 4 the display list generation request for all pages is not completed, in step S4004, it is determined that a display list generation request has not been completed for all pages (NO in step S4004), and the processing proceeds to step S4005. In step S4005, the job control unit 302 extracts the PDL data for the next page from the PDL data. If the pages have not been assigned to the respective threads, the first page is extracted.

Then, in step S4006, the job control unit 302 determines whether there are two pages for which a display list generation request is currently issued. If it is determined that there are not two pages for which a display list generation request is currently issued (NO in step S4006), the processing proceeds to step S4008. In step S4008, the job control unit 302 notifies the PDL interpreter 303 of the display list generation request of the PDL data corresponding to the page. In this step, the job control unit 302 generates a new thread B, and causes the PDL interpreter 303 to execute display list generation.

If it is determined in step S4006 that there are two pages for which a display list generation request is currently issued (YES in step S4006), in step S4007, the job control unit 302 waits until the display list generation processing for one of these pages is completed. Further, in FIG. 4, although two threads, i.e., threads B1 and B2 are illustrated, threads are dynamically generated so as to just match the number of pages.

However, since the number of threads that can be simultaneously executed by the control of steps S4006 and S4007 is limited to two, for convenience, FIG. 4 is illustrated using threads B1 and B2. In step S4007, synchronized control with thread B1 or B2 is performed. When the processing of thread B1 or B2 is completed, the processing proceeds to step S4008.

In addition, the reason why in step S4006 the determination value for the number of pages is two is to correspond to the fact that there are two CPU cores. In an exemplary embodiment having even more CPU cores, the determination value may be changed to match that number. When the processing of step S4008 is finished, the processing returns to step S4003. Then, the processing is repeated.

If it is determined in step S4003 that there is a page for which page list generation has been completed (YES in step S4003), the processing proceeds to step S4010. In step S4010, the job control unit 302 performs rendering, and then generates a bitmap. Next, in step S4011, the job control unit 302 stores the bitmap in the job data management unit 307, and issues a request to the print driver 305 to perform printing. The print request is executed by transmitting a rendering finish notification to the print driver 305.

In order for the print driver 305 to execute processing in synchronization with the engine, this processing is executed by a different thread from thread A, as thread C. In step S4201, the print driver 305, which has received the request, transmits a printing start request command to the engine, and transfers the image. Further, in step S4201, the print driver 305 also executes elapse notification processing of the cycle down time limit. Step S4201 will be separately described in more detail below.

Further, the cycle down time limit is the time until the engine enters cycle down. If a rendered page has still not come even after the cycle down time limit has passed, the engine enters cycle down.

Next, in step S4012, the job control unit 302 determines whether rendering of all the pages has been completed. If it is determined that rendering of all the pages has been completed (YES in step S4012), the flow illustrated in FIG. 4 is finished. If it is determined that rendering of all the pages has not been completed (NO in step S4012), the processing returns to step S4003. The processing is then repeated.

If it is determined in step S4004 that a display list generation request has been completed for all pages (YES in step S4004), the processing proceeds to step S4009. In step S4009, the job control unit 302 waits until the display list generation for one of these pages is completed. This control flow occurs when a display list generation request has been completed for all pages, and the flow is waiting for the processing of thread B1 or B2 to be performed.

In step S4101 of threads B1 and B2, the PDL interpreter 303 interprets the PDL data corresponding to that page, and generates a display list. The display list generation processing performed by the PDL interpreter 303 has a re-entrant configuration, in which two pieces of PDL data can be simultaneously processed. Since the threads B1 and B2 processing time is largely dependent on the amount and complexity of the PDL data to be interpreted, the finish timing cannot be predicted in advance. Therefore, the timing of display list generation completion is not necessarily in the page order.

More specifically, since the time taken by the PDL interpreters realized by the respective threads to generate the display lists changes based on the size and the configuration of the assigned page, the display lists are not necessarily generated in an order that keeps the page order.

Rearrangement into the page order during printing is executed by the print driver 305. Further, since thread A and thread C are synchronized, the processing performed in these threads is often in an idle state (this is described below for thread C). Consequently, most of the execution time in the two cores of the CPU 201 is assigned to thread B1 and thread B2.

Figure 5:
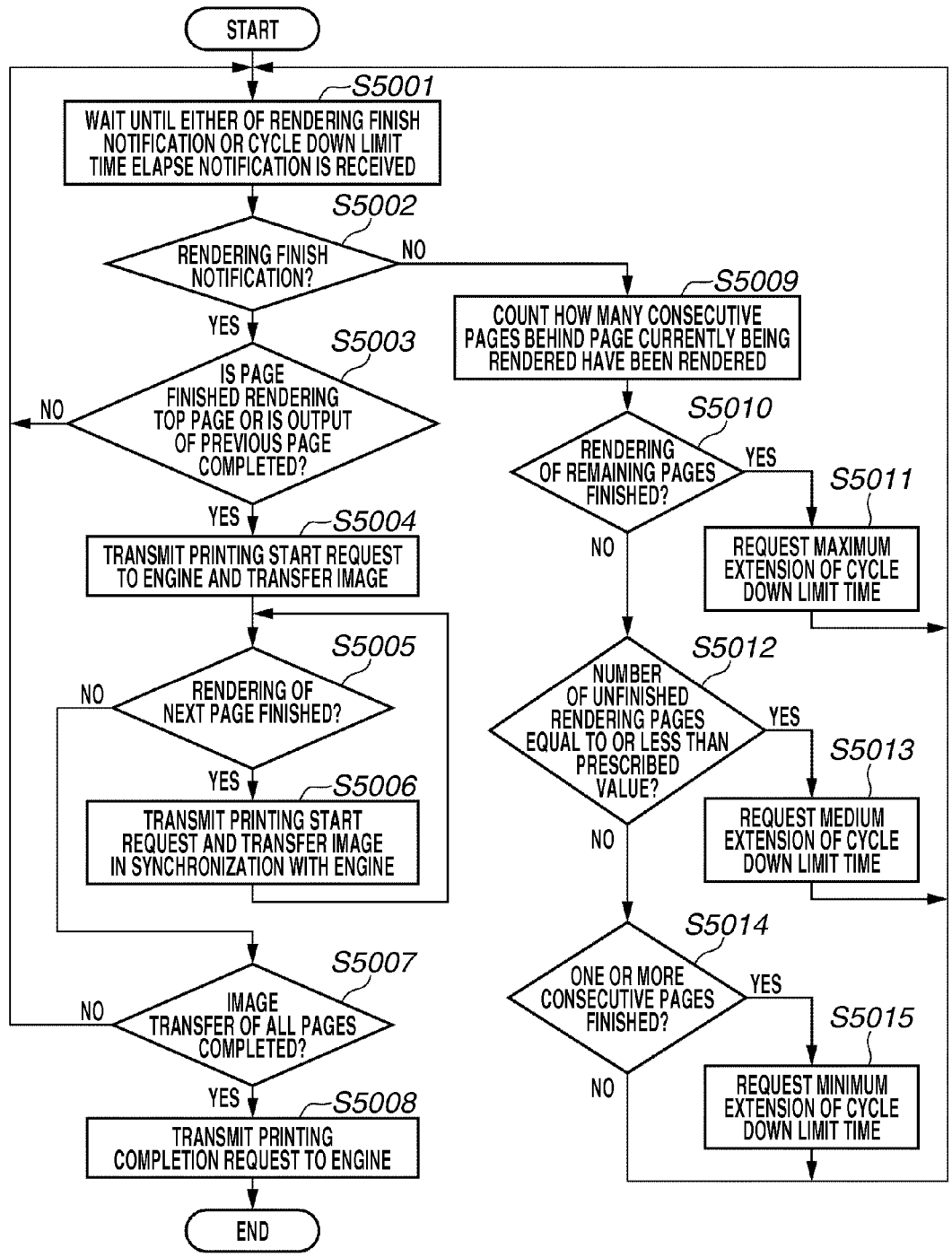
FIG. 5 is a flowchart of printer driver processing performed by the controller.

FIG. 5 is a flowchart illustrating the image transfer processing executed by the print driver 305 and the processing performed when a cycle down time limit elapse notification is received. Further, FIG. 5 is a flowchart that illustrates step S4201 of FIG. 4 in more detail.

First, in step S5001, the print driver 305 waits for either of a rendering finish notification or a cycle down time limit elapse notification to be received. As described above, the rendering finish notification is transmitted in step S4011 by the job control unit 302.

Further, the cycle down time limit elapse notification is notified to the controller 103 from the engine control unit 104. The cycle down time limit elapse notification is an inquiry to confirm whether it is OK to stop the engine due to a predetermined time elapsing since printing of the previous page by the engine control unit 104 was performed. When either one of these two notifications is received, the processing of step S5001 is finished.

Next, in step S5002, the print driver 305 determines whether the notification is a rendering finish notification. If it is determined that the notification is a rendering finish notification (YES in step S5002), the processing proceeds to step S5003. In step S5003, the print driver 305 determines whether the rendered page is the top page in the job or whether printing output of the previous page has been completed.

If it is determined that the rendered page is not the top page, and that printing output of the previous page has not been completed (NO in step S5003), the processing returns to step S5001 to wait for rendering of the previous page to be completed. As described above, since the rendering of each page is asynchronously executed in parallel, completion may not be in the page order.

If it is determined in step S5003 that the rendered page is the top page or that printing output of the previous page has been completed (YES in step S5003), the processing proceeds to step S5004. In step S5004, the print driver 305 transmits a printing start request command to the engine, and transfers the image. More specifically, the print driver 305 transmits image data and an image data formation instruction to the engine. In step S5004, the print driver 305 performs processing in synchronization with the engine control unit 104. The printer engine cannot output faster than a predetermined speed. The controller 103 has to wait for printing output of the engine control unit 104 when that RIP processing is too fast.

Next, in step S5005, the print driver 305 determines whether the next page has been rendered. If it is determined that the next page has been rendered (YES in step S5005), the processing proceeds to step S5006. In step S5006, in synchronization with the engine, the print driver 305 transmits a printing start request command, and transfers the image. Then, the processing again returns to step S5005, and the same processing is repeated. Based on the processing of steps S5005 and S5006, all of the previously rendered pages are output.

If it is determined in step S5005 that the next page has not been rendered (NO in step S5005), the processing proceeds to step S5007. In step S5007, the print driver 305 determines whether image transfer of all of the pages has been completed. If it is determined that image transfer of all of the pages has been completed (YES in step S5007), in step S5008, the print driver 305 transmits a printing completion request command to the engine control unit 104. If it is determined in step S5007 that image transfer of all of the pages has not been completed (NO in step S5007), the processing returns to step S5001, and the processing is repeated.

If it is determined in step S5002 that the notification is not a rendering finish notification (NO in step S5002), i.e., the notification is a cycle down time limit elapse notification, the processing proceeds to step S5009. In step S5009, the print driver 305 counts how many consecutive rendered pages there are following the page currently being rendered that will be printed next. This step will be described in more detail.

For example, suppose that printing has finished up to page 2, and the print engine is in a print standby state. Also, suppose that the elapsed time since the engine has been on print standby has passed the cycle down time limit. In this case, the print driver 305 will probably receive a cycle down time limit elapse notification.

Further, while thread B1 is generating the intermediate data of page 3, the print driver 305 confirms the number of pages of rendered image data corresponding to the intermediate data of the pages following page 3 generated by the other thread B2. Based on this confirmation result of the number of pages of rendered image data, the print driver 305 performs processing such as requesting an extension to the cycle down time limit, changing the degree of the extension time, or not requesting an extension time.

Next, in step S5010, the print driver 305 determines whether rendering of all the remaining pages has finished. More specifically, the print driver 305 determines whether the intermediate data for all of the pages following the page currently being rendered has been rendered. If it is determined that rendering of all the remaining pages has finished (YES in step S5010), in step S5011, the print driver 305 transmits a command to the engine control unit 104 requesting the maximum extension to the cycle down time limit. Then, the processing returns to step S5001, and the processing is repeated.

If it is determined in step S5010 that rendering of all the remaining pages has not finished yet (NO in step S5010), in step S5012, the print driver 305 determines whether the number of unfinished rendering pages is less than or equal to a prescribed value. More specifically, for the pages following the page currently being rendered, the print driver 305 determines whether the intermediate data for a greater number of pages than a prescribed value has been rendered.

If it is determined that the number of unfinished rendering pages is equal to or less than a prescribed value (YES in step S5012), in step S5013, the print driver 305 transmits a command to the engine control unit 104 requesting a medium extension to the cycle down time limit. Then, the processing returns to step S5001, and the processing is repeated.

If it is determined that the number of unfinished rendering pages is less than or equal to a prescribed value (NO in step S5012), in step S5014, the print driver 305 determines whether the rendering of one or more consecutive pages has finished. If it is determined that the rendering of one or more consecutive pages has finished (YES in step S5014), in step S5015, the print driver 305 transmits a command to the engine control unit 104 requesting a small extension to the cycle down time limit. Then, the processing returns to step S5001, and the processing is repeated.

If it is determined that the rendering of one or more consecutive pages has not finished (NO in step S5014), the processing returns to step S5001, and the processing is repeated. In the case of step S5014, an extension to the cycle down time limit is not requested.

The degree of extension to the cycle down time limit (maximum, medium, small) is notified to the engine control unit 104 as a command parameter. During execution of steps S5003 to S5007 in the present flowchart, the print driver 305 cannot receive the cycle down time limit elapse notification. However, since in steps S5003 to S5007 the printing operation is being performed based on engine throughput, a cycle down time limit elapse notification does not occur.

Figure 6:
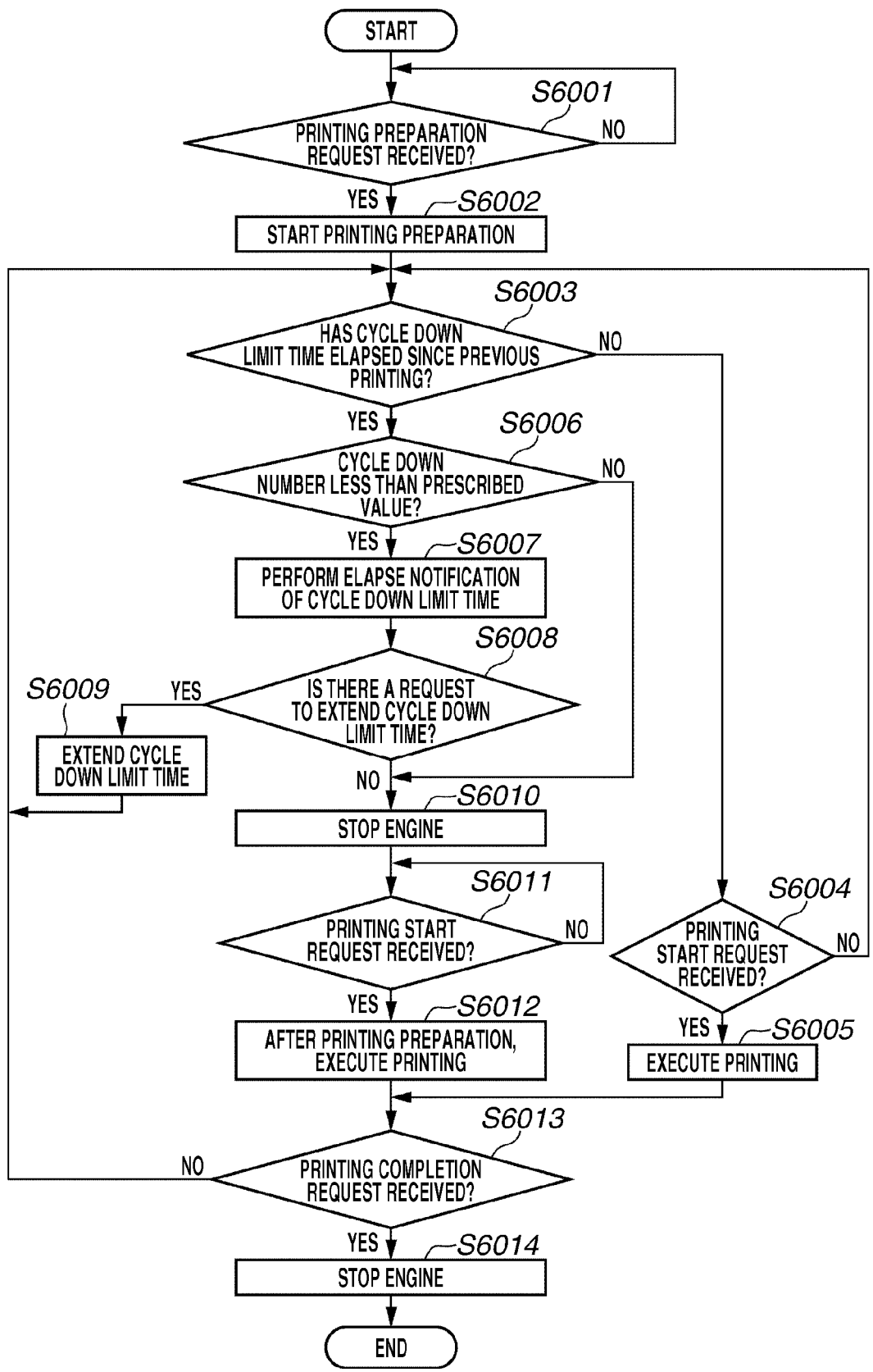
FIG. 6 is a flowchart of the print processing performed by an engine control unit.

FIG. 6 is a flowchart illustrating the basic print flow executed by the engine control unit. In step S6001, the CPU 213 determines whether a printing preparation request from the controller 103 has been received. If it is determined that a printing preparation request has been received (YES in step S6001), the processing proceeds to step S6002. In step S6002, the CPU 213 starts printing preparation processing.

Examples of printing preparation processing include starting the rotation of the polygon mirror drive motor, the photosensitive drum and the like included in the image forming units. More specifically, the CPU 213 issues a printing preparation instruction to the image forming unit 105, the ITB control unit 220, the fixing device control unit 221 and the drive system control unit 222, and executes pre-rotation processing.

Then, the engine prints the rendered pages, and enters post-rotation processing. Once the engine has entered post-rotation processing, the elapsed time count starts, and the determination whether the elapsed time has passed the cycle down time limit begins.

Next, in step S6003, the CPU 213 determines whether the cycle down time limit has elapsed since the previous printing. If it is determined that the cycle down time limit has not elapsed since the previous printing (NO in step S6003), in step S6004, the CPU 213 determines whether a printing start request command from the controller 103 has been received.

If it is determined that a printing start request command has not been received (NO in step S6004), the processing returns to step S6003, and the processing is repeated. If it is determined that a printing start request command has been received (YES in step S6004), in step S6005, the CPU 213 executes printing.

More specifically, the CPU 213 instructs the drive system control unit 222 to drive the sheet feeding unit 131. The CPU 213 controls the respective units so as to form the bitmap received from the controller 103 on the conveyed recording medium. More specifically, when there is an image data formation instruction, the printer engine forms image data without stopping the respective units in the engine.

Next, in step S6013, the CPU 213 determines whether a printing completion request has been received from the controller 103. If it is determined that a printing completion request has been received (YES in step S6013), in step S6014, the CPU 213 instructs the respective units to stop, executes post-rotation processing, and stops the engine. If it is determined that a printing completion request has not been received (NO in step S6013), the processing returns to step S6003, and the processing is repeated.

If it is determined in step S6003 that the cycle down time limit has elapsed since the previous printing (YES in step S6003), i.e., there has been no image data formation instruction even though the time period of the cycle down time limit has elapsed, the processing proceeds to step S6006. In step S6006, the CPU 213 determines whether the cycle down number since printing preparation is less than a prescribed value.

If it is determined that the cycle down number is not less than the prescribed value (NO in step S6006), the processing proceeds to step S6010. In step S6010, the CPU 213 instructs the respective units to stop, executes post-rotation processing, and stops the engine.

Next, in step S6011, the CPU 213 determines whether a printing start request command has been received. If it is determined that a printing start request command has been received (YES in step S6011), in step S6012, after printing preparation, the CPU 213 executes printing. In step S612, the same processing as insteps S6002 and S6005 is executed in order, and then the processing proceeds to step S6013.

If it is determined in step S6006 that the cycle down number is less than the prescribed value (YES in step S6006), in step S6007, the CPU 213 transmits a cycle down time limit elapse notification to the controller 103. Next, in step S6008, the CPU 213 determines whether a request command to extend the cycle down time limit has been received from the controller 103.

If it is determined that a request command to extend the cycle down time limit has been received (YES in step S6008), in step S6009, the CPU 213 extends the cycle down time limit. The engine control unit stops the respective units in the engine based on the cycle down time limit, which was extended based on the extension request.

The extension amount of the time limit is determined based on a parameter of the cycle down time limit extension request command. The level of extension is 2.0 times for a maximum case, 1.5 times for a medium case, and 1.3 times for a small case. The cycle down time limit for the present image forming is experimentally set at 4 seconds, so that the level of extension is 8.0 seconds, 6.0 seconds, and 5.2 seconds for the maximum, medium, and small cases, respectively.

Extension is to be performed on the initial time limit, and re-extension is not performed. However, when a request greater than the level of extension is received, extension is performed on the initial time limit. For example, when a maximum extension is requested after a medium extension has already been performed, the time limit is extended to 2.0 times the initial time limit. Further, the extended time limit is also reset immediately after that page has been printed. In addition, the elapsed time of the print standby time is reset immediately after printing is performed, and the count starts from the initial value.

Next, the processing returns to step S6003, and the processing is repeated. If it is determined in step S6008 that a request command to extend the cycle down time limit has not been received (NO in step S6008), the processing proceeds to step S6010.

Thus, more efficient control can be performed by delaying the operation for entering post-rotation, in consideration of the processing state of the pages following the next page that are being simultaneously processed in parallel. More specifically, productivity can be increased without causing deterioration in part life or energy consumption.

However, the initial value of the cycle down time limit has to be set smaller than that in an embodiment in which the time limit extension described in the present exemplary embodiment is not performed. Even if the time limit is reduced, the overall productivity can be increased by controlling the time limit according to the present exemplary embodiment by using an adaptive control.

First, when the cycle down number for a single print job is greater than or equal to a prescribed number, since it is highly likely that a cycle down will occur again, the time limit is not extended. In cases in which the rendering of the next page is finished, since at least a cycle down will not occur for the next page, the time limit is extended by a small level.

When rendering of all of the pages following the next page has finished, a cycle down will not occur for the remaining pages as long as a cycle down for that page is avoided. In this case, the time limit is extended by the maximum level.

Further, when the number of unfinished rendering pages is less than or equal to a prescribed value, as long as a cycle down for the present page is avoided, the chances of a cycle down occurring for the remaining pages is low. In this case, the time limit is extended by the medium level.

As described above, the RIP processing time of each page is largely dependent on the amount and complexity of the PDL data. The maximum effect can be obtained by combining a plurality of these controls, and controlling by using an adaptive control based on the trend of the PDL data.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable storage medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-082890 filed Apr. 4, 2011, which is hereby incorporated by reference herein in its entirety.

What is claimed is:

1. An image forming apparatus comprising:
 a memory; and
 a processor coupled to the memory, the processor configured to control:
  a first execution unit configured to perform processing for generating intermediate data in page units based on print data;
  a second execution unit configured to perform processing for generating intermediate data in page units based on print data in parallel with the first execution unit;
  a renderer configured to render a one page amount of image data based on the intermediate data generated by either the first execution unit or the second execution unit; and
  a printer engine configured to form image data of a page rendered by the renderer on a recording medium and to stop, after forming the image data, each element in the engine when there is no image data formation instruction corresponding to a next page of the page even after a cycle down time limit has elapsed,
 wherein the processor is further configured to control a request unit configured to, during generation of intermediate data of a predetermined page by the first execution unit, request an extension of the cycle down time limit set in the printer engine based on a number of pages of rendered image data corresponding to intermediate data of pages following the predetermined page,
 wherein the printer engine is configured to stop each element in the engine based on a cycle down time limit that has been extended based on the extension request, and
 wherein the cycle down is an operation of entering post-rotation when image data is not formed after a predetermined time has elapsed from reception of last image data.

2. The image forming apparatus according to claim 1, wherein the printer engine is configured to form image data without stopping each element in the engine when there is an image data formation instruction corresponding to the next page before the cycle down time limit elapses, and wherein the printer engine resets an elapsed time for confirming whether the cycle down time limit has elapsed, and confirms whether the cycle down time limit has elapsed.

3. The image forming apparatus according to claim 2, wherein the request unit is configured to change a requested extension time based on the number of pages of rendered image data.

4. The image forming apparatus according to claim 3, wherein the request unit is configured to request a maximum extension of the cycle down time limit when the number of pages of rendered image data is all of the pages following the predetermined page.

5. The image forming apparatus according to claim 4, wherein the request unit is configured to request a medium extension of the cycle down time limit when the number of pages of rendered image data is greater than or equal to a prescribed value.

6. The image forming apparatus according to claim 5, wherein the request unit is configured to request a small extension of the cycle down time limit when the number of pages of rendered image data is one or more consecutive pages.

7. A method for controlling an image forming apparatus, the method comprising:
 performing a first processing for generating intermediate data in page units based on print data;
 performing a second processing for generating intermediate data in page units based on print data in parallel to the first processing;
 rendering a one page amount of image data based on the intermediate data generated by either the first processing or the second processing;
 forming image data of a rendered page on a recording medium;
 stopping, after forming the image data, each element in a printer engine when there is no image data formation instruction corresponding to a next page of the page even after a cycle down time limit has elapsed; and
 requesting, during generation by the first processing of intermediate data of a predetermined page, an extension of the cycle down time limit set in the printer engine based on a number of pages of rendered image data corresponding to intermediate data of pages following the predetermined page,
 wherein stopping each unit in the printer engine is based on a cycle down time limit that was extended based on the extension request, and
 wherein the cycle down is an operation of entering post-rotation when image data is not formed after a predetermined time has elapsed from reception of last image data.

8. A non-transitory computer-readable storage medium storing a program that causes an image forming apparatus to execute the method according to claim 7.

* * * * *